US009825384B2

(12) United States Patent
Kurkowski et al.

(10) Patent No.: US 9,825,384 B2
(45) Date of Patent: Nov. 21, 2017

(54) SOLDERLESS EDGE CONNECTOR

(71) Applicant: LifeHealth, LLC, Roseville, MN (US)

(72) Inventors: James D. Kurkowski, Roseville, MN (US); Thomas Paul Brastad, Ramsey, MN (US)

(73) Assignee: LifeHealth, LLC, Roseville, MN (US)

( * ) Notice: Subject to any disclaimer, the term of this patent is extended or adjusted under 35 U.S.C. 154(b) by 0 days.

(21) Appl. No.: 15/395,438

(22) Filed: Dec. 30, 2016

(65) Prior Publication Data

US 2017/0194730 A1 Jul. 6, 2017

Related U.S. Application Data

(60) Provisional application No. 62/273,836, filed on Dec. 31, 2015.

(51) Int. Cl.
*H01R 12/72* (2011.01)
*H01R 13/193* (2006.01)
*G01N 27/416* (2006.01)

(52) U.S. Cl.
CPC ......... *H01R 12/721* (2013.01); *G01N 27/416* (2013.01); *H01R 13/193* (2013.01)

(58) Field of Classification Search
CPC .............. H01R 23/722; H01R 23/7073; H01R 23/7042; H01R 23/7068; H01R 9/096; H01R 2103/00
USPC ........................ 439/65, 329, 79, 573, 607.07
See application file for complete search history.

(56) References Cited

U.S. PATENT DOCUMENTS 4,693,529 A * 9/1987 Stillie .................... H01R 12/52 439/493
5,785,534 A * 7/1998 Longueville ....... H01R 23/6873 439/607.07
6,695,646 B1 * 2/2004 Grabbe ............. H01R 13/2492 439/607.07
6,918,775 B2 * 7/2005 Korsunsky ........... H01R 13/193 439/65
7,287,986 B2 * 10/2007 Ho ....................... B41J 2/17526 439/65

* cited by examiner

*Primary Examiner* — Gary Paumen
(74) *Attorney, Agent, or Firm* — Schwegman Lundberg & Woessner, P.A.

(57) ABSTRACT

A point-of-care system that can include a contact pad on a printed circuit board and a connector assembly for retaining a lead and positioning the lead in contact with the pad on the printed circuit board and with interfaces of a cuvette. The connector assembly can include a base component and a clamp component, where the base component can define at least one recessed track for receiving each lead. The clamp component can be secured to the base component to clamp the at least one lead between the base component and the clamp component without flux or solder. The connector assembly can be secured to the printed circuit board without flux or solder.

17 Claims, 10 Drawing Sheets

SOLDERLESS EDGE CONNECTOR

CLAIM OF PRIORITY

This patent application claims the benefit of priority, under 35 U.S.C. Section 119(e), to Kurkowski el al., U.S. Patent Application Ser. No. 62/273,836, entitled "SOLDERLESS EDGE CONNECTOR," filed on Dec. 31, 2015, each of which is hereby incorporated by reference herein in its entirety.

TECHNICAL FIELD

This document pertains generally, but not by way of limitation, to point-of-care analyzers for evaluating samples contained in a cuvette.

BACKGROUND

Point-of-care analyzer instruments are used to evaluate biological samples collected from the patient at the time of collection of the sample or soon after collection. A cuvette is used to collect or receive collected biological sample and interface the sample with the analysis systems of the analyzer instrument. The cuvettes for receiving biological samples are advantageous as the cuvettes are typically disposable or reusable after washing. The cuvettes are also often configured to avoid directly contacting the collected sample with the circuitry for processing the samples, which would require the circuitry pins to be cleaned or replaced after each use to avoid contamination. However, a specialized connector is required to connect the cuvette to the analysis system and interface the sample with the pins of the analysis system. An improperly inserted cuvette can result in a poor connection between the cuvette and the pins, which can cause poor or inconsistent readings. A similar disadvantage is that the cuvette is typically small in size requiring the sensor interfaces to be tightly spaced on the cuvette. The tight spacing of the interfaces and the corresponding tight spacing of the pins can cause leakage current and other interference between the pins, which can further result in poor or inconsistent readings.

OVERVIEW

The present inventors have recognized, among other things, that a problem to be solved can include performing sensitive electrochemical analysis of a biological sample on a cuvette, where the sensor information from the cuvette is transmitted to a reader that is electrically connected to the cuvette. However, the tightly spaced pins and the corresponding circuits required to connect the cuvette to the reader can result in electrical leakage between adjacent circuits preventing the low ohm continuity and high pin-to-pin impedance. A problem to be solved can include that the sensitive electrochemical analysis often performed by the reader requires near-zero ohm continuity (<5Ω) between the pins while maintaining high pin-to-pin impedance (>5 GΩ). In particular, the flux commonly used to solder leads or components to the circuit board can further increase the leakage between the adjacent circuits and leads. Other contaminants left on the connector assembly during construction or fluids on the cuvette or circuits can similarly create leakage between the leads.

In an example, the present subject matter can provide a solution to this problem, such as by a solderless connector assembly for a reader assembly can include a base component and a clamp component that can be connected to the base component so as to retain at least one lead there between. The base component and the clamp component cooperate to retain the leads without soldering the leads, which can cause electrical leakage between adjacent leads. In at least one example, the reader can be portable to operate as a point-of-care analyzer where a cuvette can be connected to a circuit on board the reader via the at least one lead for evaluating a biological sample contained within the cuvette.

The lead can have a cuvette end and a circuit end, where the lead is positioned between the base component and the clamp component such that the cuvette end and the circuit end protrude from between the base component and the clamp component. The circuit end of each lead can be positioned to contact a circuit pad of a circuit board, where the clamping of the connector assembly maintains the circuit end of the lead in contact with the circuit board. This arrangement removes the need to solder the lead to the circuit board removing a potential leakage point. In addition, the connector assembly can be removed from the circuit board without desoldering. In this configuration, a cuvette having a plurality of cuvette contacts can be positioned adjacent to the connector assembly such that the cuvette end engages the cuvette contacts to operably connect the cuvette to the circuit board. In an example, the cuvette end can be shaped such that positioning the cuvette such that the cuvette end of the lead engages the cuvette contacts and biases the lead maintaining contact between the lead and the cuvette contact.

In at least one example, the base component can define at least one recessed track for receiving a lead, wherein securing the clamp component to the base component encloses each recessed track and isolates the recessed track from the adjacent recessed track. The clamp component can define at least one corresponding track mirroring one of the recessed tracks, wherein the recessed track and corresponding track cooperate to define a channel for receiving a lead. The base component and/or the clamp component can comprise a high impedance material to minimize electrical leakage between the adjacent tracks and the leads received therein.

In an example, a reader can include a circuit board, at least one circuit pad, and a connector assembly, where the connector assembly can include a base component, a clamp component and at least one lead. The base component can define at least one recessed track for receiving each lead. The clamp component can be secured to the base component to clamp the at least one lead between the base component and the clamp component. The connector assembly can be operably engaged to the circuit board such that the lead between the base component and the clamp component engages a corresponding contact of the circuit.

In an example, a point-of-care system can include a printed circuit board, a connector assembly, and a cuvette including at least one interface. The base component can define at least one recessed track for receiving each lead. The clamp component can be secured to the base component to clamp the at least one lead between the base component and the clamp component. The connector assembly can be operably engaged to the circuit board such that the lead between the base component and the clamp component engages a corresponding contact of the circuit. The cuvette can further include at least one cuvette contact, wherein the cuvette is moveable into an inserted position wherein the at least one cuvette contact is positioned to engage a cuvette end of the lead.

This overview is intended to provide an overview of subject matter of the present patent application. It is not intended to provide an exclusive or exhaustive explanation of the present subject matter, The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
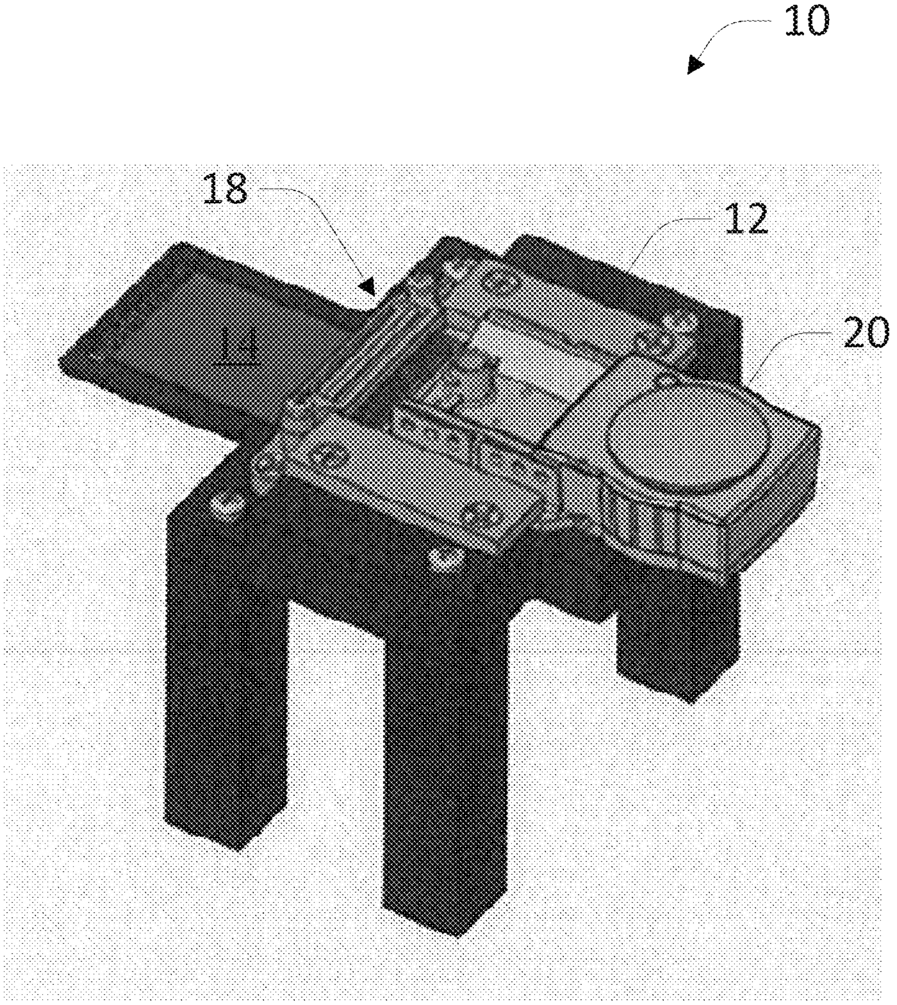
FIG. 1 is a perspective view of a connector assembly connected to a sample fixture according to an example of the present disclosure with a cuvette inserted.
Figure 2:
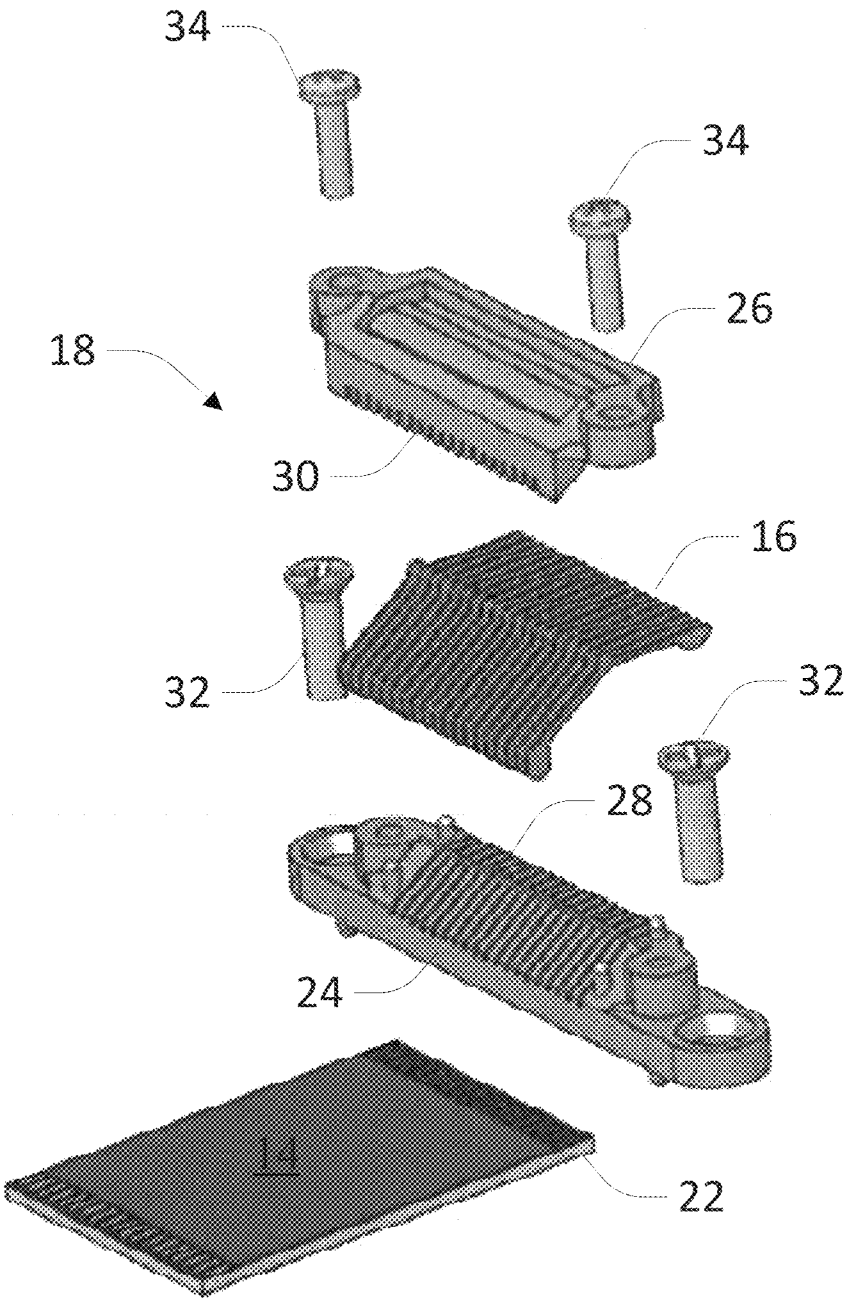
FIG. 2 is a perspective exploded view of a solderless connector assembly according to an example of the present disclosure.
Figure 9:
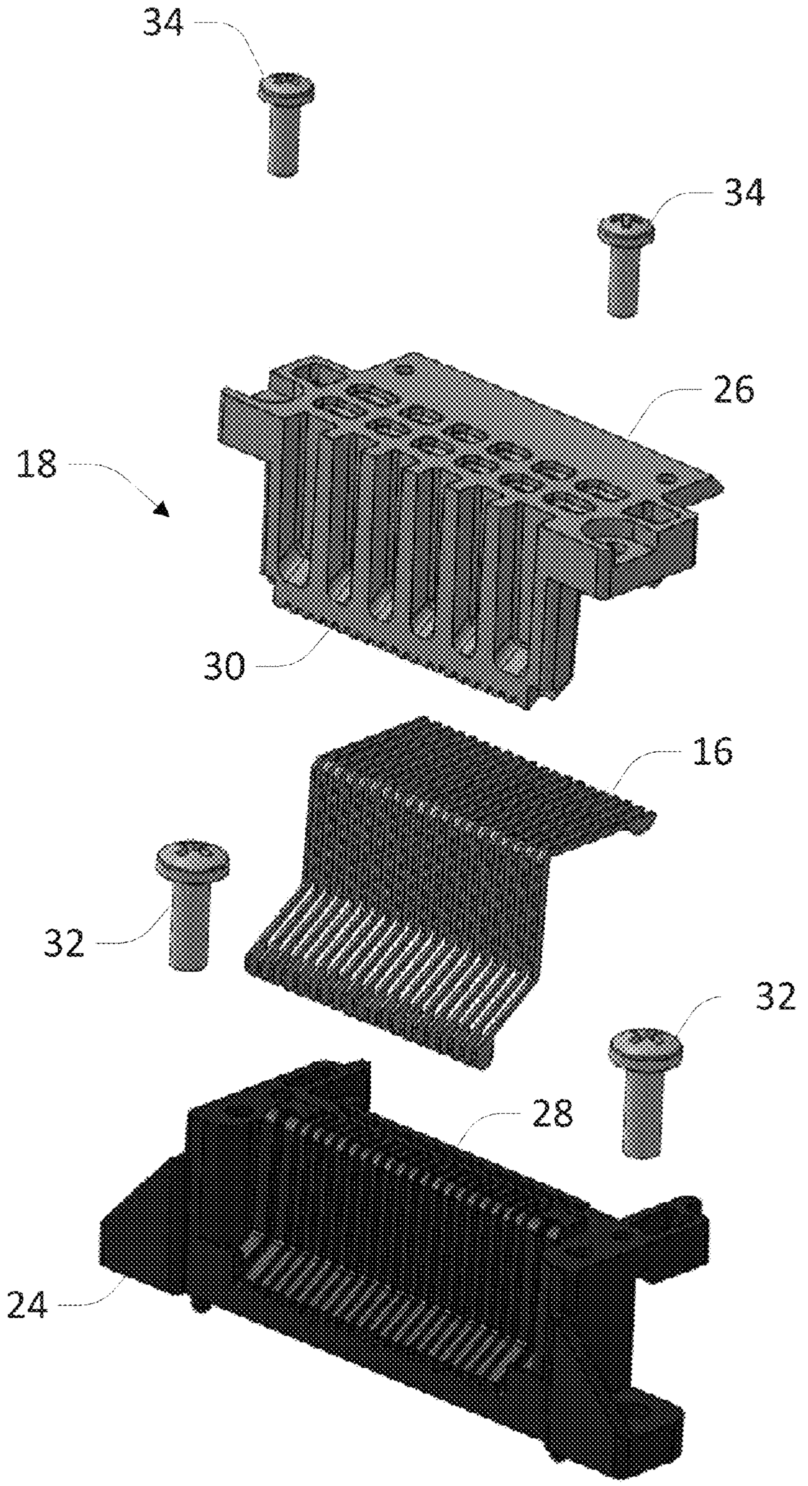
FIG. 9 is a perspective exploded view of a connector assembly according to an example of the present disclosure.
Figure 10:
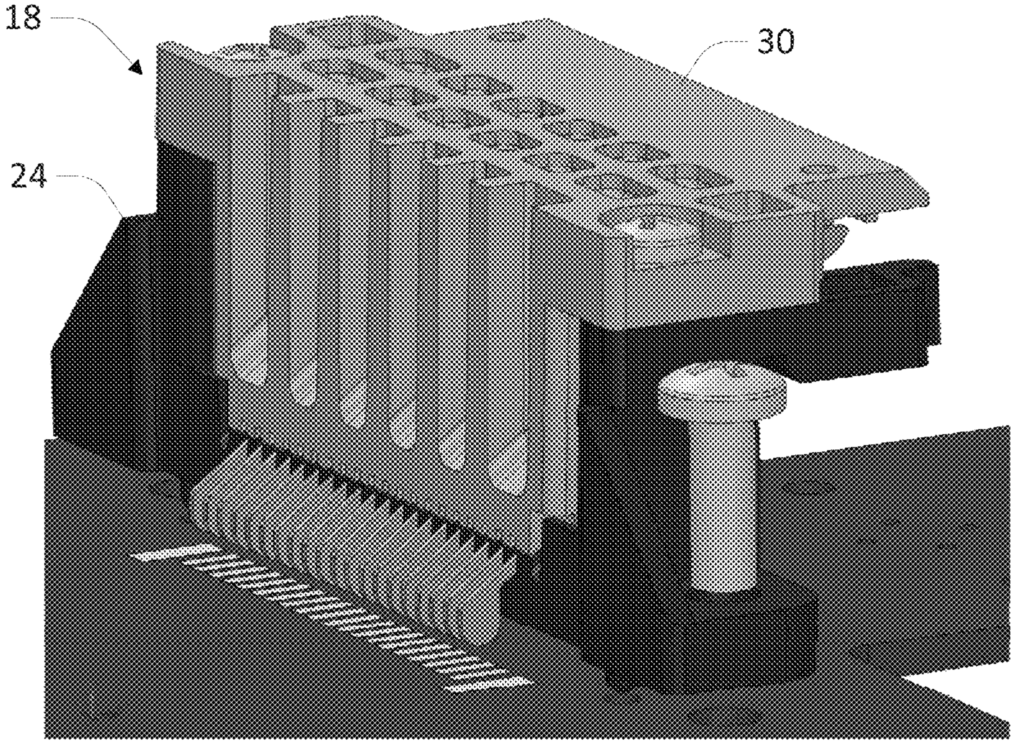
FIG. 10 is a perspective view of a solderless connector as it is mounted to a PCB according to an example of the present disclosure.

As depicted in FIGS. 1-2 and 9, a reader 10, according to an example of the present disclosure, can include a frame 10, a printed circuit board ("PCB") 14, at least one lead 16 and a connector assembly 18. The reader 10 can be portable to operate as a point-of-care ("POC") analyzer for evaluating cuvettes 20 containing biological samples. The connector assembly 18 can be coupled to the frame 10 adjacent the PCB 14 to contact a PCB end 38 of the lead 16 with a contact of the PCB 14 and configured to retain the lead 16 against the PCB 14. The cuvette end 40 of the lead 16 protrudes from the connector assembly 18 such that the cuvette 20 can be positioned against to the connector assembly 18 such that a cuvette contact of the cuvette 20 can engage the cuvette end 40 of the lead 16. In at least one example, the analyzer frame 12 can define a slot for receiving the cuvette 20 and position the cuvette contacts of the cuvette 20 adjacent the leads 16.

As depicted in FIGS. 1-2 and 9, in an example, the connector assembly 18 can include a base component 24 and a clamp component 26. The base component 24 can define at least one recessed track 28 for receiving a lead 16. The clamp component 26 can be secured to the base component 24 to enclose each recessed track 28 to retain the lead 16 within the track 28. In at least one example, the clamp component 26 can include at least one corresponding track 30 cooperating with a recessed track 28 to define a channel for receiving the recessed track 28. The base component 24 can be configured to receive at least one fastener 32 coupling the base component 24 to the analyzer frame 12. As depicted in FIG. 9, in an example, the base component 24 can have notched portion for receiving the cuvette 20 and aligning the contacts of the cuvette 20 with the leads 16.

As depicted in FIGS. 2 and 9, in at least one example, the clamp component 24 is configured to receive at least one fastening element 34 that can be engaged to a corresponding threaded hole 32 defined by the base component 24. The fastening element 34 can be tightened to bias the clamp component 26 toward the base component 24 to retain the leads 16 between the clamp component 26 and the base component 24.

As depicted in FIGS. 2 and 9, in at least one example, the base component 24 can define an angled surface to orient the leads 16 toward a cuvette 20. The clamp component 26 can have a corresponding surface angled to complement the angled surface. In at least one example, the lead 16 extends from between the base component 24 and the clamp component 26. The lead 16 can be flexible such that inserting the cuvette 20 flexes the lead 16 before the lead 16 biases into engagement with the interfaces of the cuvette 20.

Figure 3:
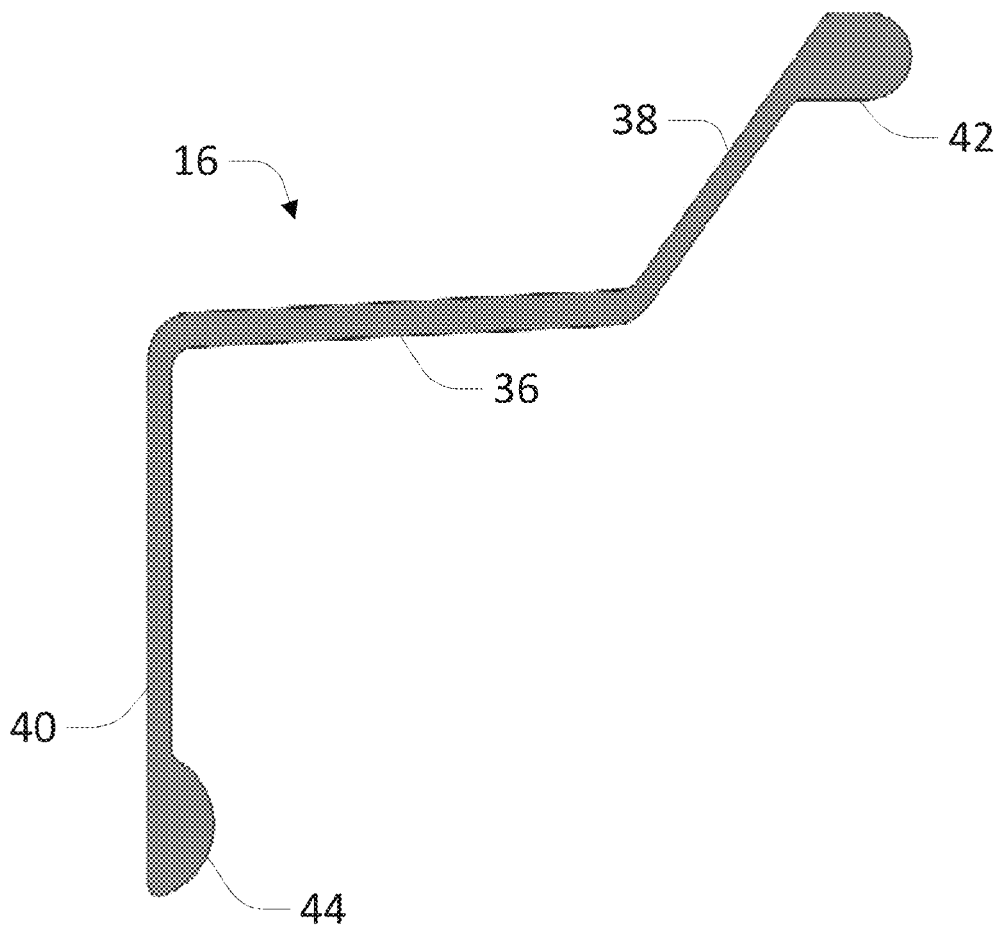
FIG. 3 is a side view of a lead according to an example of the present disclosure.
Figure 4:
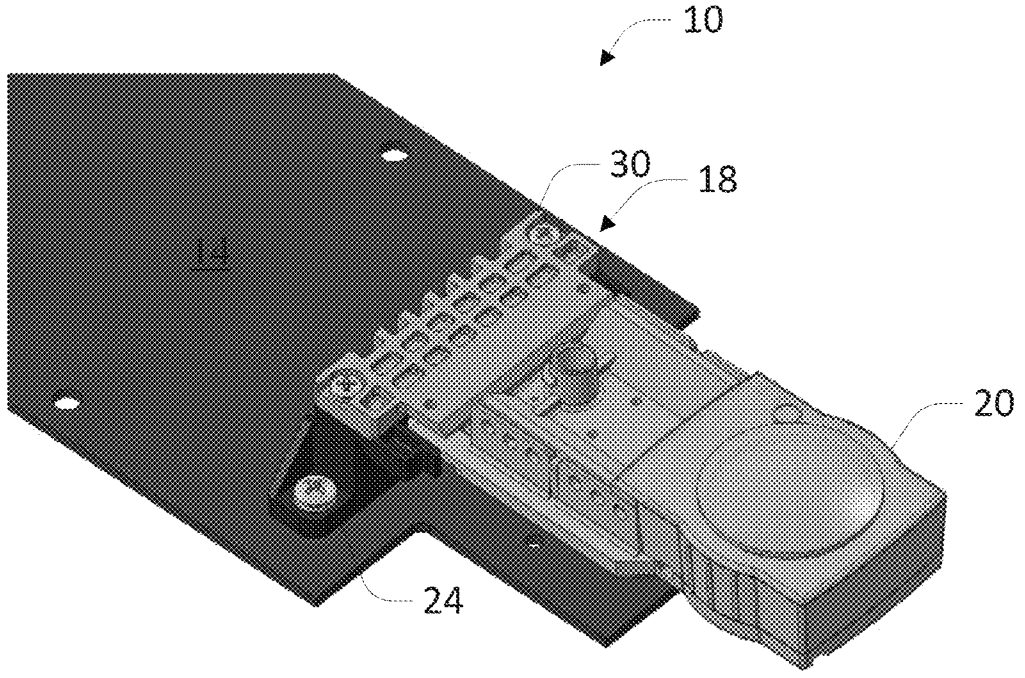
FIG. 4 is a perspective view of a solderless connector mounted to a PCB according to an example of the present disclosure with a cuvette inserted.
Figure 5:
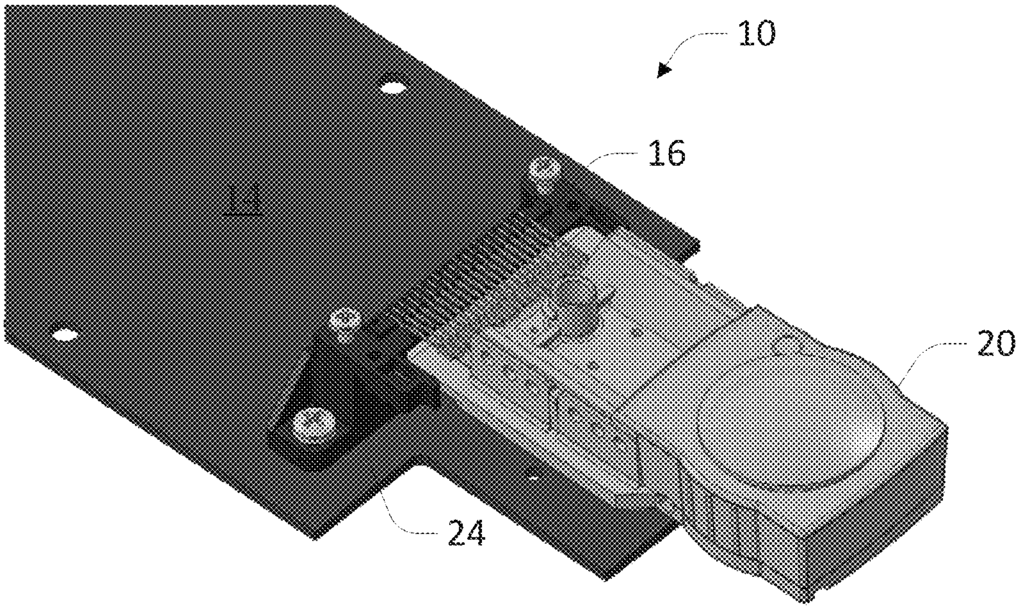
FIG. 5 is a perspective view of the solderless connector and cuvette depicted in FIG. 4 in which a clamp component of the connector assembly is removed according to an example of the present disclosure.
Figure 6:
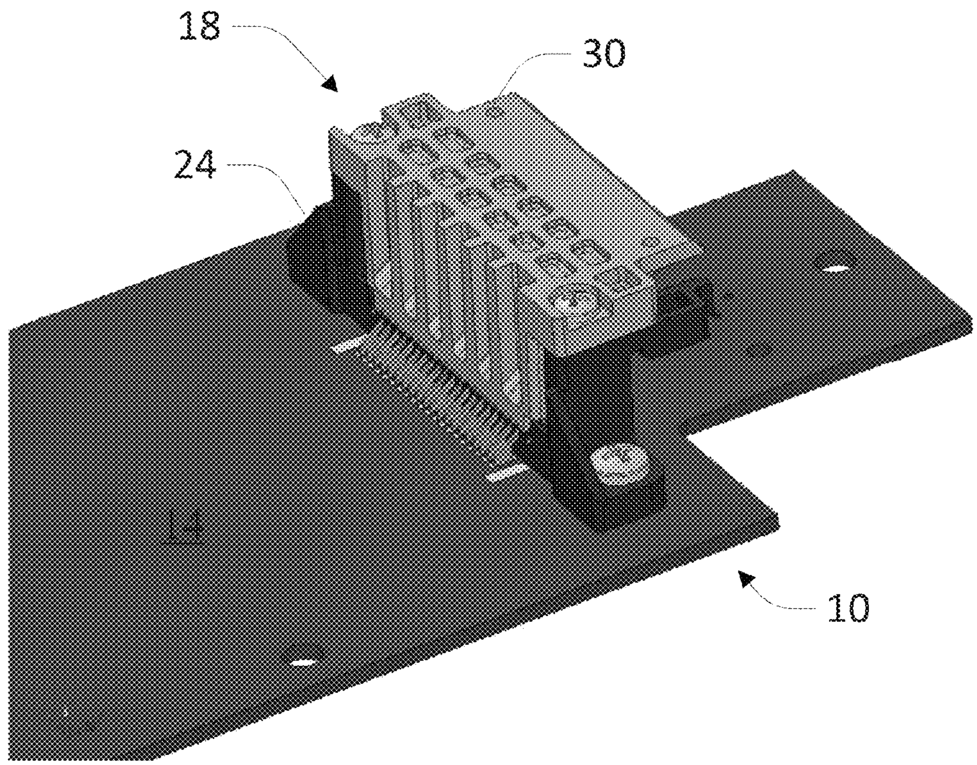
FIG. 6 is a perspective view of a solderless connector mounted to a PCB prior to cuvette insertion according to an example of the present disclosure.

As depicted in FIGS. 4-6 and 10, during assembly, in at least one example, at least one fastener 32 is inserted through the base component 24 to fix the base component 24 to the analyzer frame 12. A fastening element 34 can be inserted through the clamp component 26 to tighten the clamp component 26 to the base component 24 and retain the leads 16 within the respective recessed track 28 such that the cuvette end 40 and the PCB end 38 of each lead 16 extends from between the base component 24 and the clamp component 26. Each lead 16 can be positioned to reside within a recessed track 28 defined by the base component 24 such that the ends of the lead extend from recessed track of the base component 24 such that cuvette end 40 and the PCB end 38 protrude from the connector assembly 18. The PCB 14 can then be mounted to the analyzer frame 12 such that an extended end of the lead 16 can flexibly engage the PCB 14. As depicted in FIG. 3, in at least one example, each lead 16 can include a center portion 36, a cuvette end 40 and a PCB end 38. The cuvette end 40 is configured to engage the interfaces of the cuvette 20 and the PCB end 38 is configured to engage the interfaces 22 of the PCB 14. In this configuration, the lead 16 can be interfaced with the PCB 14 without solder, which can damage the PCB 14 or provide leakage points impeding accurate results. Similarly, the connector assembly 18 can be removed from the PCB 14 and replaced without requiring removal of the solder connecting the lead 16 to the PCB 14. In at least one example, the cuvette end 40 can include a cuvette engagement feature 44 for engaging the interfaces of the cuvette 20. The PCB end 38 can include a PCB engagement feature 42 for engaging the interfaces 22 of the PCB 14. In this configuration, the center portion 36 can be received within the recessed track 28 such that the cuvette end 40 and the PCB end 38 extend from between the base component 24 and the clamp component 26. The cuvette end 40 and the PCB end 38 can be flexibly connected to the center portion 36 such that the cuvette end 40 and the PCB end 38 can flex with respect to the center portion 36. The flexibility of the cuvette end 40 can permit the flexing of the lead 16 as the cuvette 20 is inserted, which biases the cuvette end 40 against the contacts of the cuvette 20.

As depicted in FIG. 3, in an example, the cuvette end 40 can have variable thickness for engaging the contacts of the cuvette 20. In at least one example, the cuvette end 40 can be thickened to increase the biasing force applied to the contacts of the cuvette 20. In at least one example, the cuvette end 40 can be thinned to reduce the biasing force applied to the contacts of the cuvette 20.

As depicted in FIG. 3, in an example, the PCB end 38 can have variable thickness for engaging the interfaces 22 of the PCB 14. In at least one example, the PCB end 38 can be thickened to increase the biasing force applied to the interfaces 22 of the PCB 14. In at least one example, the PCB end 14 can be thinned to reduce the biasing force applied to the interfaces 22 of the PCB 14.

Figure 7:
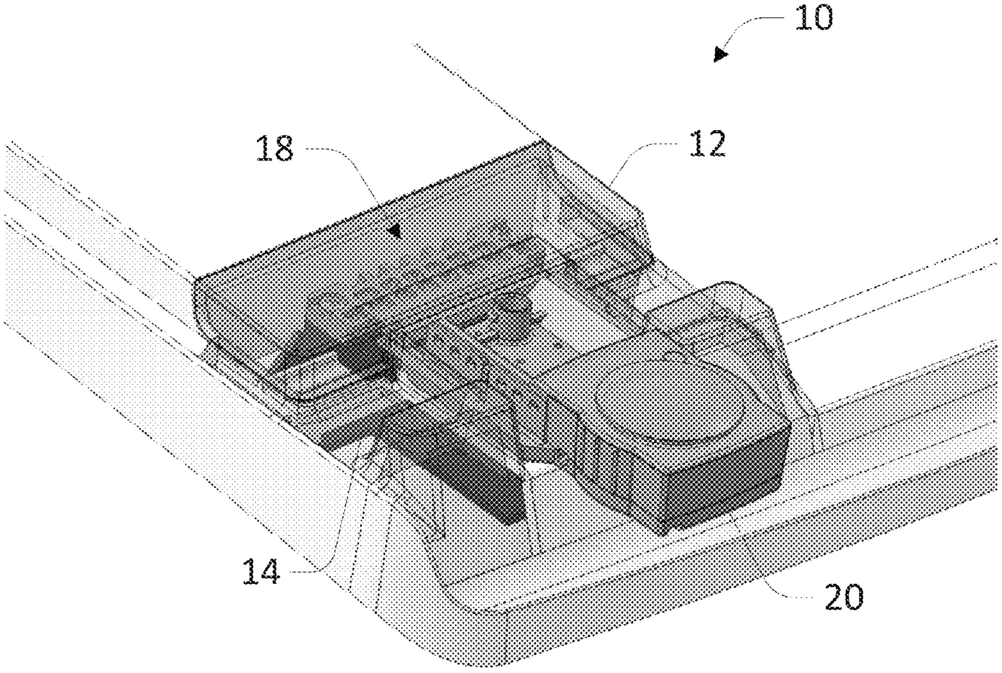
FIG. 7 is a partially transparent perspective view of a point-of-care analyzer according to an example of the present disclosure with a cuvette inserted.
Figure 8:
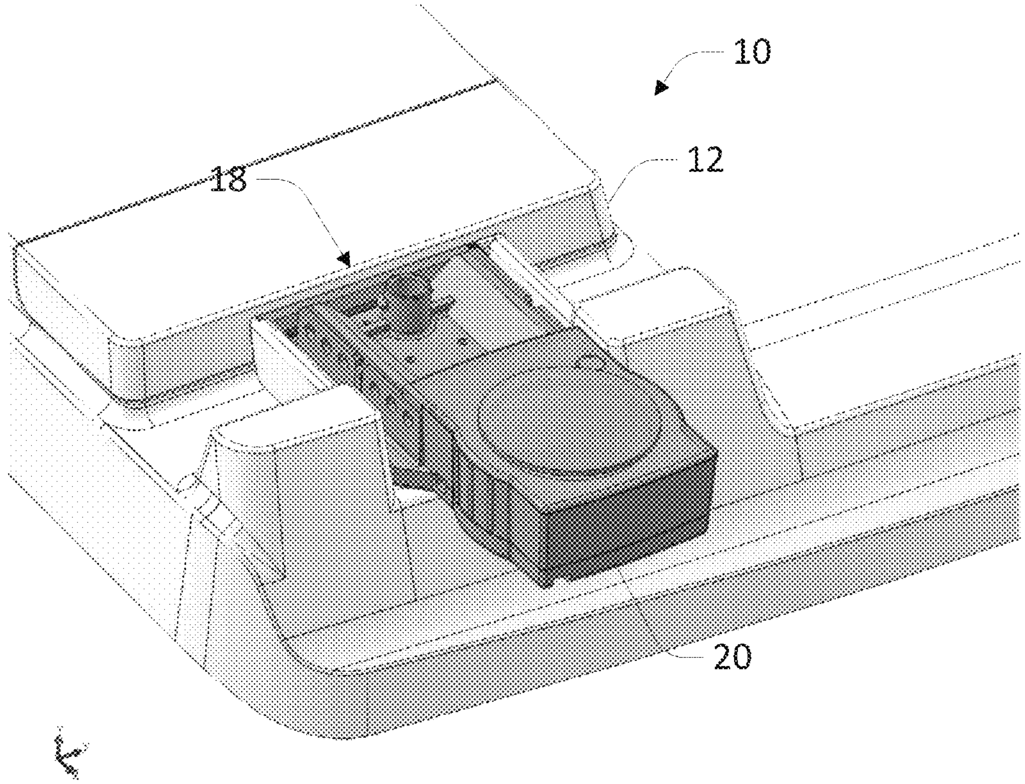
FIG. 8 is a perspective view of a point-of-care analyzer according to an example of the present disclosure with a cuvette inserted.

As depicted in FIGS. 7 and 8, in operation, a cuvette 20 is inserted into the analyzer frame 12 such that the cuvette 20 is positioned adjacent the leads 16. In at least one example, the exposed ends of the leads 16 flex as the cuvette 20 is inserted until the cuvette 20 is positioned in the inserted position. In the inserted position, the interfaces are aligned with the leads 16 such that the leads 16 bias from the flexed configuration to engage the interfaces of the cuvette 20. In at least one example, the leads 16 flex as the cuvette 20 is drawn from the analyzer frame 12 and return to the original position when the cuvette 20 is withdrawn from the analyzer frame 12.

Various Notes & Examples

Example 1 is a circuit assembly comprising: an edge connector assembly including: a base component; a clamp component connected to the base component; at least one lead having a center portion, a circuit end, and a second circuit end; wherein the clamp component is configured to be tightened against the base component to secure the at least one lead there between; a printed circuit board having at least one circuit contact; wherein the edge connector assembly is fastened to the printed circuit assembly without requiring solder for either mechanical or electrical connection to the at least one circuit contact.

In Example 2, the subject matter of Example 1 optionally includes, wherein the base component defining at least one recessed track for receiving the at least one lead.

In Example 3, the subject matter of Example 2 optionally includes, wherein the recessed track is sized to receive the center portion of the at least one lead such that the circuit end and the cuvette end protrude from the connector assembly.

In Example 4, the subject matter of any one or more of Examples 1-3 optionally include, further comprising: an analyzer frame for receiving the printed circuit board.

In Example 5, the subject matter of Example 4 optionally includes, wherein the base component is configured to receive at least one fastener for coupling the base component to the analyzer frame adjacent the printed circuit board.

In Example 6, the subject matter of any one or more of Examples 4-5 optionally include, wherein the analyzer frame defines a slot for receiving the cuvette to position an interface of the cuvette in contact with the cuvette end of the lead.

In Example 7, the subject matter of any one or more of Examples 1-6 optionally include, wherein the clamp component is configured to receive a fastening element for tightening the clamp component against the base component.

In Example 8, the subject matter of Example 7 optionally includes, wherein the fastening element is adjustable such that the fastening element is selectively tightenable to adjust the tension applied to the leads positioned between the clamp component and the base component.

In Example 9, the subject matter of any one or more of Examples 1-8 optionally include, wherein the analyzer is a point-of-care analyzer.

Example 10 is a point-of-care system, comprising: a printed circuit board having at least one circuit contact; a connector assembly include: a base component; a clamp component adjustably connected to the base component; at least one lead having a center portion, a circuit end, and a cuvette end, wherein the clamp component is configured to be tightened against the base component to secure the at least one lead such that the circuit end engage the circuit contact of the printed circuit board; a cuvette including at least one interface movable into an inserted position, wherein the interfaces of the cuvette are aligned with the PCB end of the corresponding lead when the cuvette is in the inserted position.

In Example 11, the subject matter of Example 10 optionally includes, wherein the base component defining at least one recessed track for receiving the at least one lead.

In Example 12, the subject matter of Example 11 optionally includes, wherein the recessed track is sized to receive the center portion of the at least one lead such that the circuit end and the cuvette end protrude from the connector assembly.

In Example 13, the subject matter of any one or more of Examples 10-12 optionally include, further comprising: an analyzer frame for receiving the printed circuit board.

In Example 14, the subject matter of Example 13 optionally includes, wherein the base component is configured to receive at least one fastener for coupling the base component to the analyzer frame adjacent the printed circuit board.

In Example 15, the subject matter of any one or more of Examples 13-14 optionally include, wherein the analyzer frame defines a slot for receiving the cuvette to position the circuit contact of the cuvette in contact with the cuvette end of the lead.

In Example 16, the subject matter of any one or more of Examples 10-15 optionally include, wherein the clamp component is configured to receive a fastening element for affixing the clamp component to the base component.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

What is claimed is:

1. A circuit assembly comprising:

an edge connector assembly including:

a base component;

a clamp component connected to the base component;

at least one lead having a center portion, a circuit end, and a second circuit end;

wherein the clamp component is configured to be tightened against the base component to secure the at least one lead there between;

a printed circuit board having at least one circuit contact;

wherein the edge connector assembly is fastened to the printed circuit assembly without requiring solder for either mechanical or electrical connection to the at least one circuit contact.

2. The assembly of claim 1, wherein the base component defining at least one recessed track for receiving the at least one lead.

3. The assembly of claim 2, wherein the recessed track is sized to receive the center portion of the at least one lead such that the circuit end and the cuvette end protrude from the connector assembly.

4. The assembly of claim 1, further comprising:

an analyzer frame for receiving the printed circuit board.

5. The assembly of claim 4, wherein the base component is configured to receive at least one fastener for coupling the base component to the analyzer frame adjacent the printed circuit board.

6. The analyzer of claim 4, wherein the analyzer frame defines a slot for receiving the cuvette to position an interface of the cuvette in contact with the cuvette end of the lead.

7. The assembly of claim 1, wherein the clamp component is configured to receive a fastening element for tightening the clamp component against the base component.

8. The assembly of claim 7, wherein the fastening element is adjustable such that the fastening element is selectively tightenable to adjust the tension applied to the leads positioned between the clamp component and the base component.

9. The assembly of claim 1, wherein the analyzer is a point-of-care analyzer.

10. A point-of-care system, comprising:

a printed circuit board having at least one circuit contact;

a connector assembly include:

a base component;

a clamp component adjustably connected to the base component;

at least one lead having a center portion, a circuit end, and a cuvette end, wherein the clamp component is configured to be tightened against the base component to secure the at least one lead such that the circuit end engage the circuit contact of the printed circuit board;

a cuvette including at least one interface movable into an inserted position, wherein the interfaces of the cuvette are aligned with the PCB end of the corresponding lead when the cuvette is in the inserted position.

11. The point-of-care system of claim 10, wherein the base component defining at least one recessed track for receiving the at least one lead.

12. The point-of-care system of claim 11, wherein the recessed track is sized to receive the center portion of the at least one lead such that the circuit end and the cuvette end protrude from the connector assembly.

13. The point-of-care system of claim 10, further comprising:

an analyzer frame for receiving the printed circuit board.

14. The point-of-care system of claim 13, wherein the base component is configured to receive at least one fastener for coupling the base component to the analyzer frame adjacent the printed circuit board.

15. The point-of-care system of claim 13, wherein the analyzer frame defines a slot for receiving the cuvette to position the circuit contact of the cuvette in contact with the cuvette end of the lead.

16. The point-of-care of claim 10, wherein the clamp component is configured to receive a fastening element for affixing the clamp component to the base component.

17. The point-of-care of claim 16, wherein the fastening element is adjustable such that the fastening element is selectively tightenable to adjust the tension applied to the leads positioned between the clamp component and the base component.

* * * * *